US012774152B2

(12) United States Patent
Satoh

(10) Patent No.: US 12,774,152 B2
(45) Date of Patent: Oct. 27, 2026

(54) PACKAGING MEMBER FOR PACKAGING OBJECT TO BE TRANSPORTED BETWEEN CLEAN ROOMS, PACKAGING METHOD, AND TRANSPORTING METHOD

(71) Applicant: SHIN-ETSU HANDOTAI CO., LTD., Tokyo (JP)

(72) Inventor: Seiji Satoh, Annaka (JP)

(73) Assignee: SHIN-ETSU HANDOTAI CO., LTD., Tokyo (JP)

(*) Notice: Subject to any disclaimer, the term of this patent is extended or adjusted under 35 U.S.C. 154(b) by 331 days.

(21) Appl. No.: 18/567,123

(22) PCT Filed: May 26, 2022

(86) PCT No.: PCT/JP2022/021480
§ 371 (c)(1),
(2) Date: Dec. 5, 2023

(87) PCT Pub. No.: WO2023/286465
PCT Pub. Date: Jan. 19, 2023

(65) Prior Publication Data

US 2024/0262611 A1 Aug. 8, 2024

(30) Foreign Application Priority Data

Jul. 13, 2021 (JP) ................................. 2021-115692

(51) Int. Cl.
*B65D 85/30* (2006.01)
*B65G 49/06* (2006.01)

(52) U.S. Cl.
CPC ........... *B65D 85/30* (2013.01); *B65G 49/061* (2013.01); *B65G 2201/0297* (2013.01)

(58) Field of Classification Search
CPC .................. B65D 85/30; B65G 49/061; B65G 2201/0297
(Continued)

(56) References Cited

U.S. PATENT DOCUMENTS 2,998,129 A * 8/1961 Bekins .................. B65D 25/04 206/499
5,875,892 A * 3/1999 Martin .............. H05K 13/0084 206/459.1
(Continued)

FOREIGN PATENT DOCUMENTS

CN 103848116 A 6/2014
CN 117136167 A * 11/2023 .......... H01M 10/052
(Continued)

OTHER PUBLICATIONS

Translation (Year: 2018).*
(Continued)

*Primary Examiner* — Terrell H Matthews
(74) *Attorney, Agent, or Firm* — Oliff PLC

(57) ABSTRACT

A packaging member for packaging an object to be transported between clean rooms, the packaging member being used for packaging the object to be transported, being a FOUP or a FOSB, when transport thereof between the clean rooms each having a clean atmosphere of a semiconductor factory, in which the packaging member includes a dust-free cloth having dust-proof property and damp-proof property. The packaging member is capable of transporting an object to be transported between clean rooms at low cost while maintaining the high cleanness of the object to be transported, being the FOUP or the FOSB.

3 Claims, 6 Drawing Sheets

(58) Field of Classification Search
USPC .......................................................... 414/340
See application file for complete search history.

(56) References Cited

U.S. PATENT DOCUMENTS

| | | | | |
|---|---|---|---|---|
| 6,351,925 | B2 * | 3/2002 | Isido ...................... | B65D 65/08 53/589 |
| 2001/0015053 | A1 * | 8/2001 | Isido ...................... | B65D 65/08 53/449 |
| 2009/0249747 | A1 | 10/2009 | Nishiura et al. | |
| 2018/0118398 | A1 | 5/2018 | Li et al. | |
| 2018/0161723 | A1 * | 6/2018 | Kodo ........................ | B32B 3/12 |
| 2020/0219741 | A1 * | 7/2020 | Yun ..................... | H10P 72/0438 |

FOREIGN PATENT DOCUMENTS

| | | | | | |
|---|---|---|---|---|---|
| JP | H11-208708 | A | | 8/1999 | |
| JP | 2001-303314 | A | | 10/2001 | |
| JP | 2003-004274 | A | | 1/2003 | |
| JP | 2004-150674 | A | | 5/2004 | |
| JP | 2008-007127 | A | | 1/2008 | |
| JP | 2014-070305 | A | | 4/2014 | |
| JP | 2016132473 | A | * | 7/2016 | |
| JP | 2020-111389 | A | | 7/2020 | |
| WO | 2013168782 | A1 | | 11/2013 | |
| WO | WO-2018037805 | A1 | * | 3/2018 | ............... H01B 5/16 |

OTHER PUBLICATIONS

Translation (Year: 2016).*

Jul. 26, 2022 International Search Report issued in International Patent Application No. PCT/JP2022/021480.

Jan. 16, 2024 International Preliminary Report on Patentability issued in International Patent Application No. PCT/JP2022/021480.

Jul. 9, 2024 Notification of Reasons of Refusal issued in Japanese Patent Application No. 2021-115692.

Oct. 1, 2024 Decision of Refusal issued in Japanese Patent Application No. 2021-115692.

Apr. 14, 2026 Office Action issued in Chinese Patent Application No. 202280042090.3.

Dec. 1, 2025 Office Action and Search Report issued in Taiwanese Patent Application No. 111120035.

* cited by examiner

[FIG. 1]
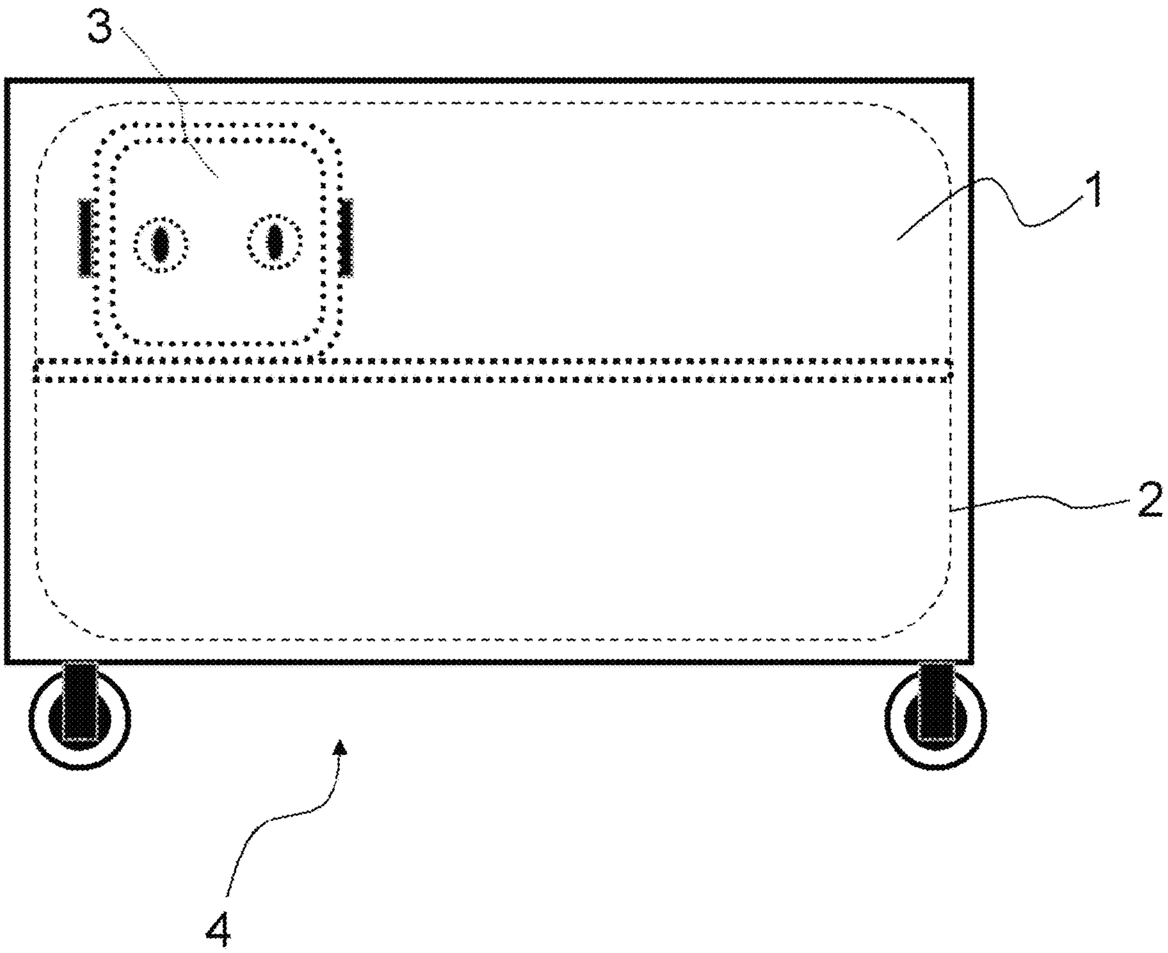

[FIG. 2]
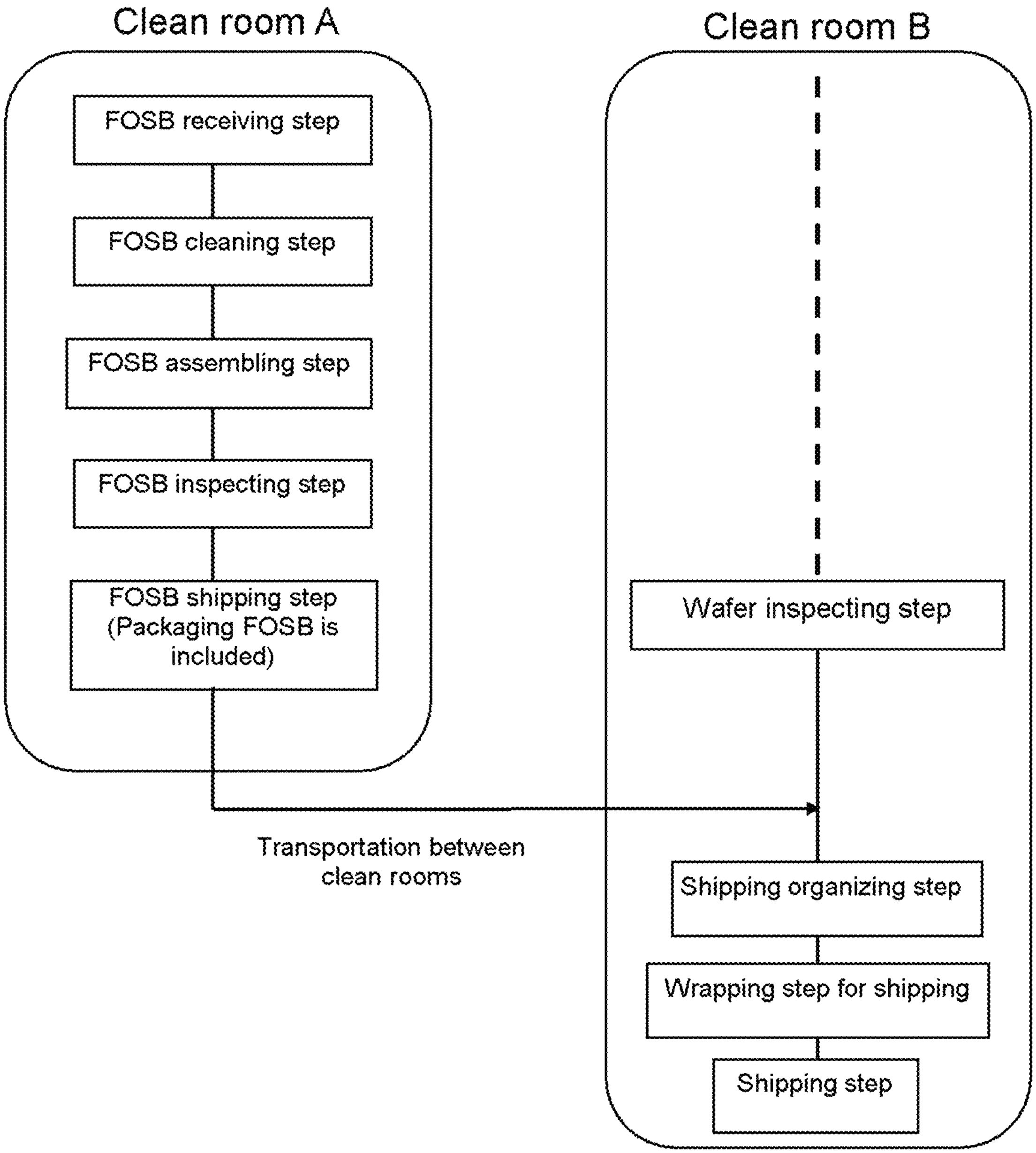

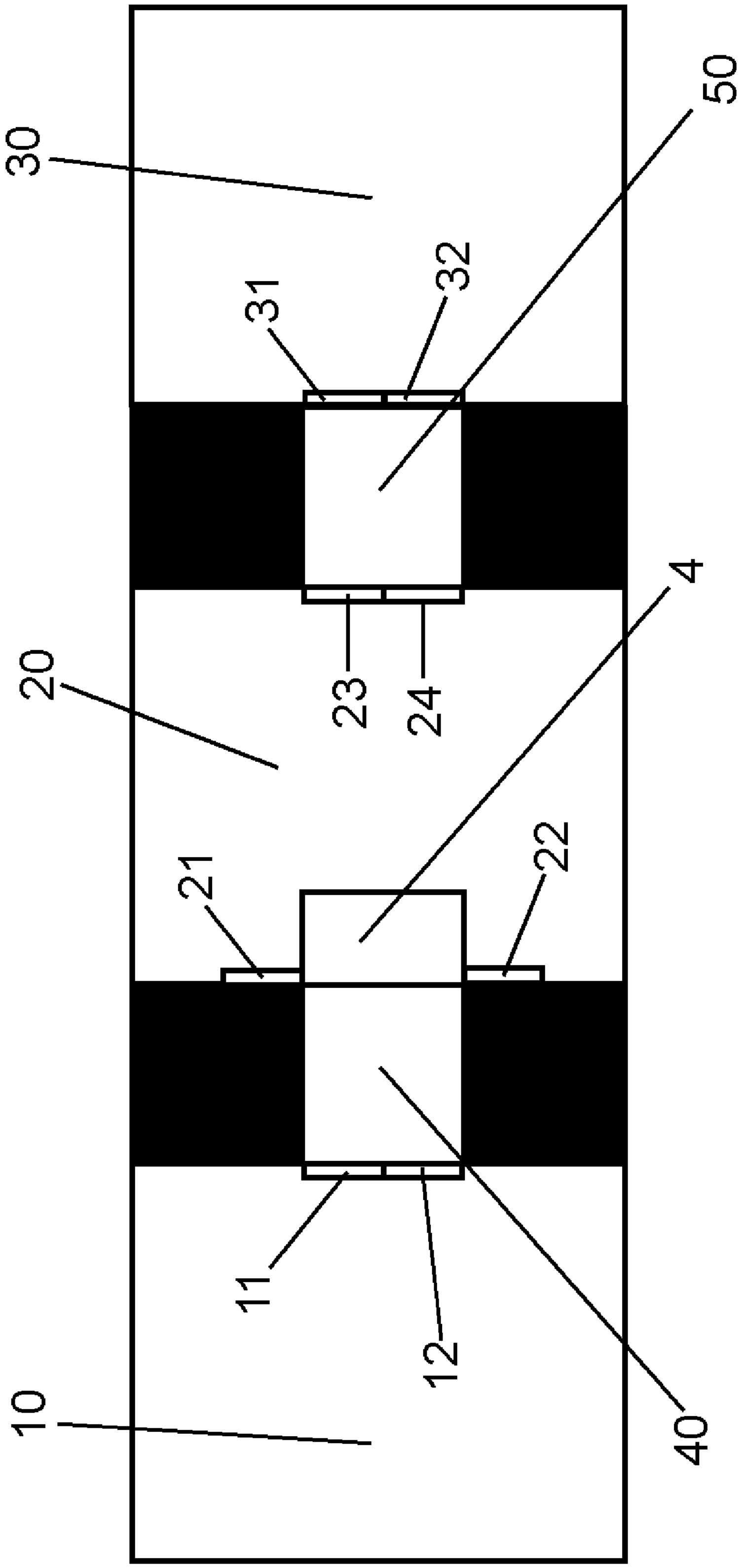
[FIG. 3]

[FIG. 4]
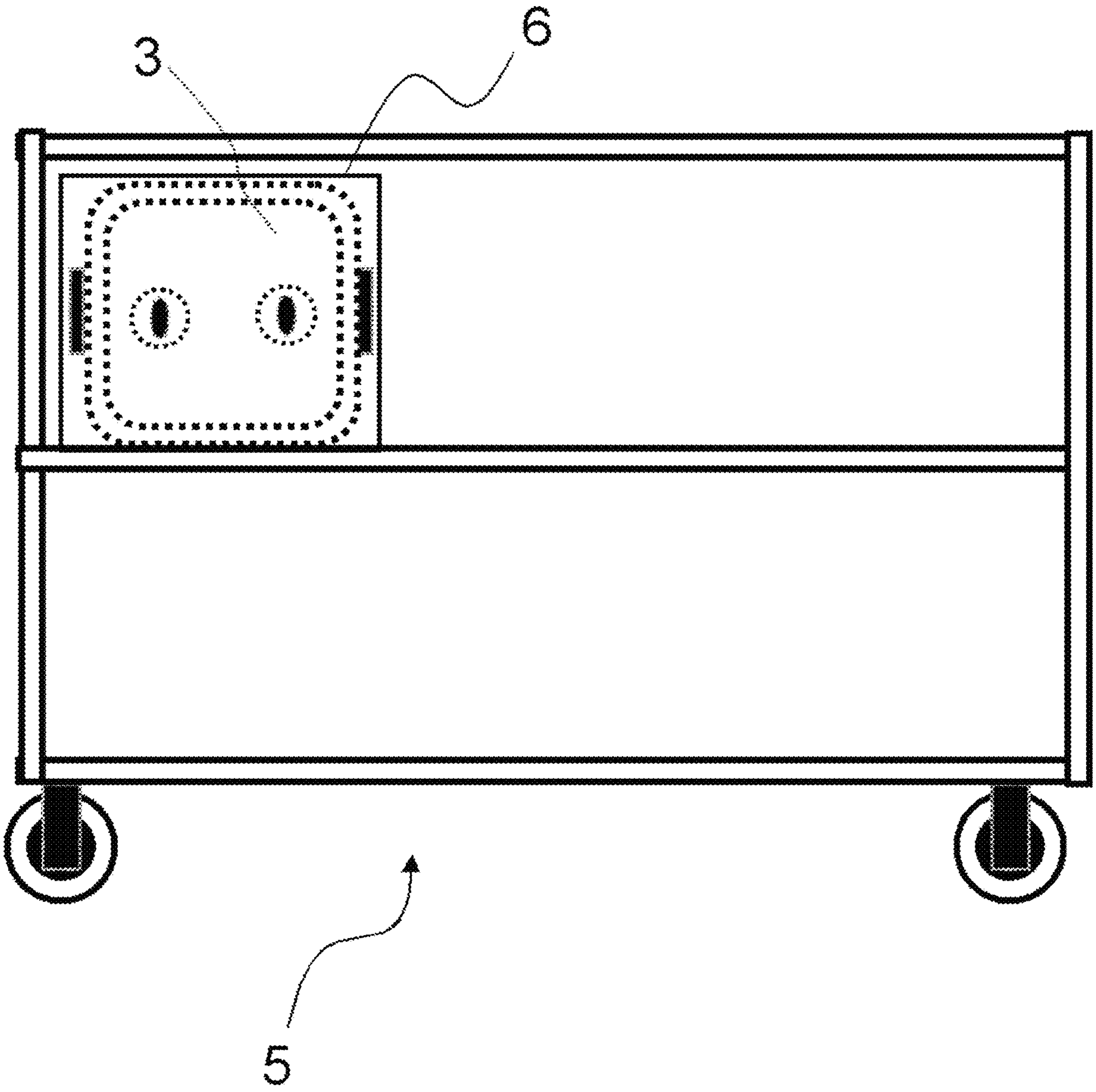

[FIG. 5]
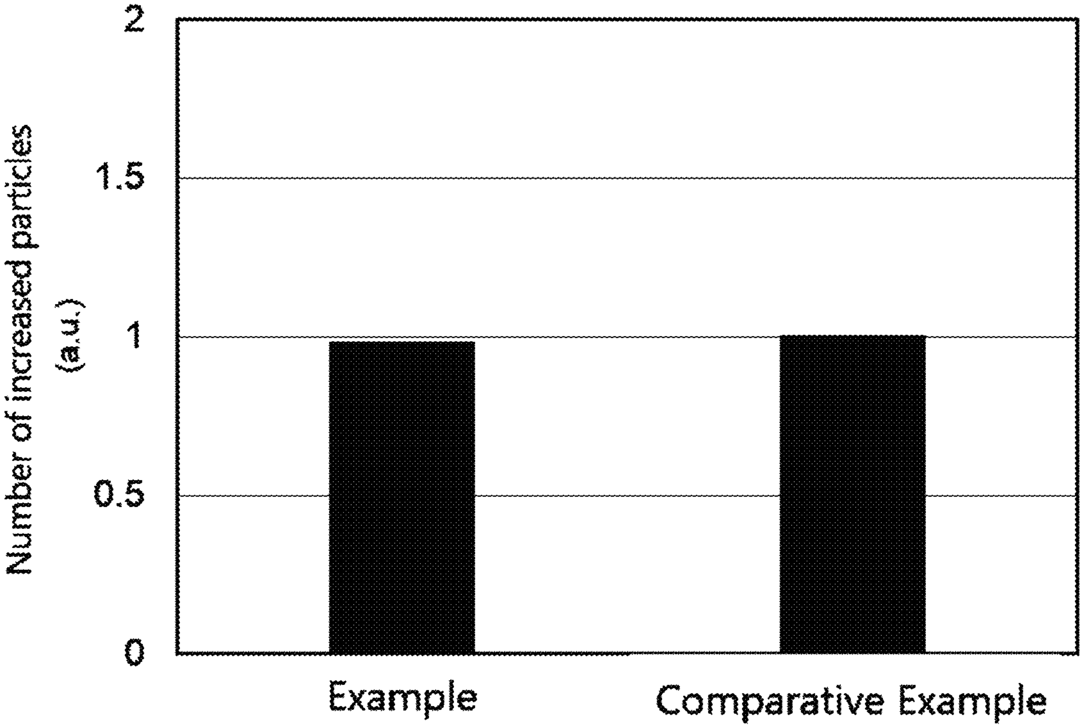

[FIG. 6]
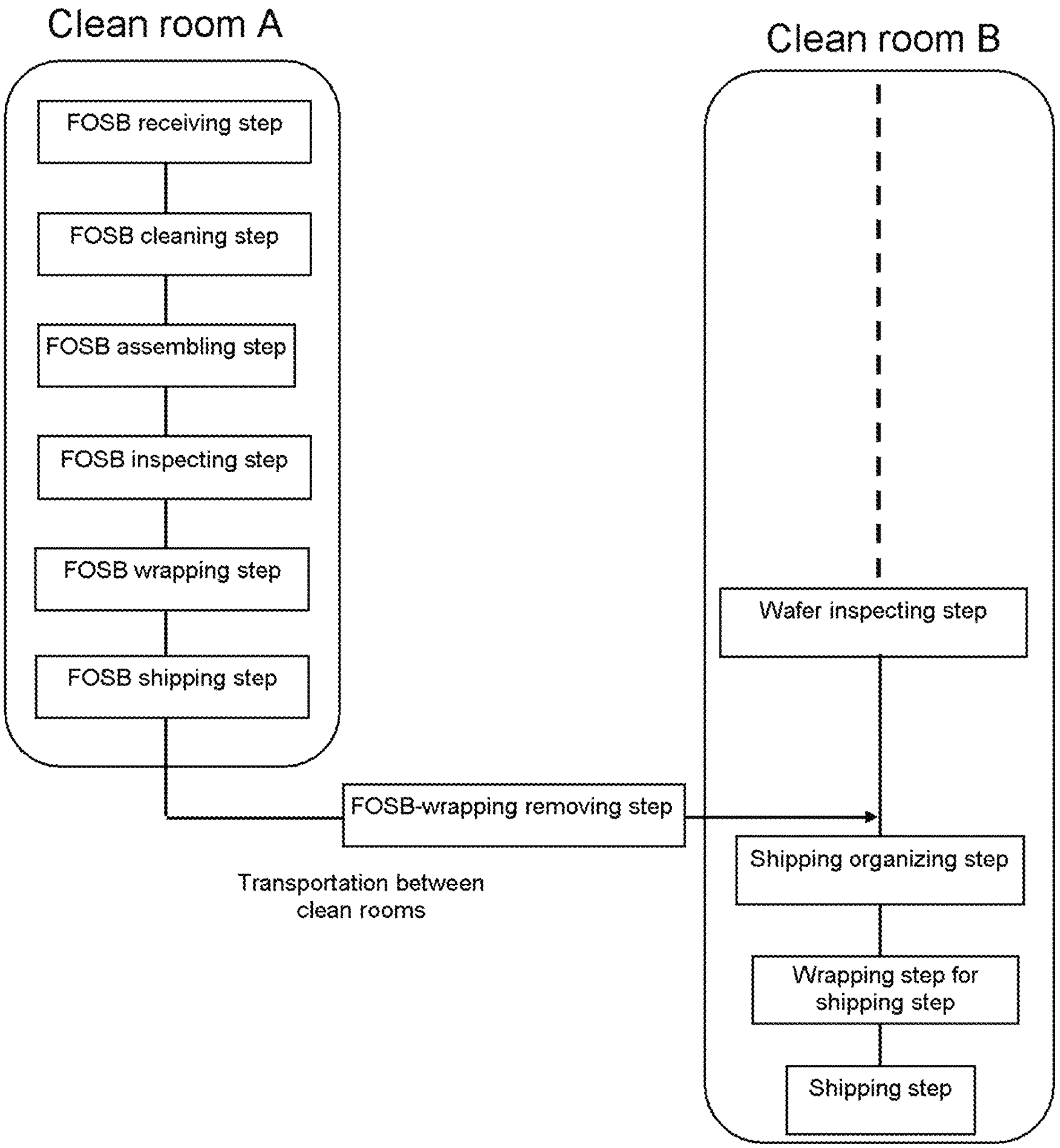

PACKAGING MEMBER FOR PACKAGING OBJECT TO BE TRANSPORTED BETWEEN CLEAN ROOMS, PACKAGING METHOD, AND TRANSPORTING METHOD

TECHNICAL FIELD

The present invention relates to a packaging member (cover) for packaging a FOUP or a FOSB to be transported between clean rooms, a packaging method, and a transporting method.

BACKGROUND ART

In a semiconductor manufacturing factory, for example, in a semiconductor wafer-producing step, strict management is in place for management of dust, such as particles, and contamination by metal impurities. Thereby, a wrapping and packaging step immediately before final inspection and shipment needs to be conducted in clean rooms where the particles and the metal contamination are strictly controlled.

In these clean rooms, the particles and the metal contamination are strictly controlled, and an operator working in the clean rooms wears a dust-free suit (a clean suit) made of a special dust-free cloth, covers a mouth and a nose with a mask, puts gloves made of resin on hands, and takes measures to minimize dust generation from a human body. For the most strictly controlled working-area, the number of people who enter the clean rooms is limited and controlled, and the number of people who enter the working area is also limited, thus, the management of particles and metal contamination is conducted. In addition, items (pens and papers) brought into the clean rooms are specially designed for use in the rooms, and PCs and printers are also dust-proofed.

In a semiconductor factory, steps are not necessarily connected each other in the same clean room. Consequently, due to steps being performed in different areas, various articles are to be transported across rooms (the clean rooms), across floors (the clean rooms) in different floors, and/or across buildings (the clean rooms). For example, in the case of a semiconductor wafer, the wafer is stored in a Front Opening Unified Pod (FOUP) and transported between the steps. A size and a material of the FOUP are defined in detail according to Semiconductor Equipment and Material International (SEMI) standards. Moreover, when the semiconductor wafer as a material is shipped and conveyed from a semiconductor material manufacturer to a semiconductor device manufacturer, the wafer is stored in a Front Open Shipping Box (FOSB), and then transported and conveyed. Details of the FOSB are also defined in Semiconductor Equipment and Material International (SEMI) standards in details.

When the FOUP or the FOSB is transported between the clean rooms in the semiconductor factory, there is no particular problem if there is a clean tunnel or a clean elevator. However, if there is no clean tunnel or clean elevator, or if the FOUP or the FOSB is moved between buildings (the clean rooms), it is necessary to wrap the FOUP or the FOSB in resin bags.

Patent Document 1 discloses a method of packaging a carried-in object to be carried in clean rooms, specifically, an apparatus for manufacturing a semiconductor device, and a packaging material of packaging the object.

Patent Document 2 discloses dust-free clothes to be worn during work in clean rooms.

Patent Document 3 discloses a temporary dust-proof tent used when piping or cabling work is performed in clean rooms and a working method.

Patent Document 4 discloses a dual-packing clean-transporting carrier for transporting an object to be transported into a clean room.

Patent Document 5 discloses a fiber used for dust-free clothes worn in a clean room and a method to make the clothes.

CITATION LIST

Patent Literature

Patent Document 1: JP H11-208708 A
Patent Document 2: JP 2001-303314 A
Patent Document 3: JP 2003-004274 A
Patent Document 4: JP 2004-150674 A
Patent Document 5: JP 2014-070305 A

SUMMARY OF INVENTION

Technical Problem

In the transportation of an object to be transported, being a FOUP or a FOSB, between clean rooms in a semiconductor factory, the object to be transported has thus far been wrapped by such as bags made of resin, and then, transported and conveyed from a clean room into a clean room via a common outside air environment. These bags made of resin are products obtained by processing a resin material, which does not generate dust in the clean rooms, into a sheet shape and molding the resultant in a bag shape. The opening of the bag is hermetically sealed by a heat sealer to seal an object to be transported therein, thereby making the bag for wrapping. Even in the common outside air environment which is outside the clean room, the object to be transported, being the FOUP or the FOSB, is hermetically wrapped in the bags made of resin and thus is transported in a state of being protected from dust, such as particles (powdery dust) and metal impurities contained in outside air. Moreover, in the case of more strict management, a method has been performed in which these resin bags are used for double-wrapping, and a single layer (an outer wrapping) of the double wrapping is torn open in a room (a cushion room) adjacent to the clean room and having a lower cleanness than the clean room. Then, an inner single-wrapped object to be transported is brought into the clean room, and the object to be transported is taken out from the bag made of resin in the clean room. In this case, operation is necessary in which wrapping of one or more bags in the clean room is performed before transportation and tearing of these wrappings in the clean room is performed after the transportation to take out the object to be transported. Moreover, one or more resin bags are needed as a wrapping material, and because the material is brought into the clean room, it is necessary to use a material having a dust generation with a low amount, a material with a damp-proof property that is not affected by the humidity of the outside air and prevents both moisture permeation and moisture absorption, or a material subjected to special processing such as coating or laminating so as to exert the low dust generation property and the damp-proof property. However, these materials are extremely costly. Although the wrapping member used here is extremely costly, the material is torn when the object to be transported is taken out as described above, resulting in being discarded after use. In addition, there has been a cost increase problem due to an apparatus for heat sealing the opening of each bag after the object to be transported is put into the bag made of resin, securing a working area for sealing these bags, and the like. Moreover, although a clean tunnel or a clean elevator can be provided to connect the clean rooms, there is a problem that a larger amount of investment in plant and equipment is required.

The present invention has been made to solve the above-described problem. An object of the present invention is to provide a packaging member, a method for packaging, and a method for transporting that enables to transport an object to be transported, being a FOUP or a FOSB, between the clean rooms at low cost while a cleanness of the object to be transported is maintained at a high level.

Solution to Problem

To solve the problem described above, the present invention provides a packaging member for packaging an object to be transported between clean rooms, the packaging member being used for packaging the object to be transported, being a FOUP or a FOSB, when transport thereof between the clean rooms each having a clean atmosphere of a semiconductor factory, wherein the packaging member includes a dust-free cloth having dust-proof property and damp-proof property.

The inventive packaging member made of the dust-free cloth having dust-proof property and damp-proof property can be provided as the packaging member (cover) for protecting the object to be transported, being the FOUP or the FOSB, from dust generation, particles (powdery dust) contained in the outside air, dust of metal contaminants, or moisture. Accordingly, by using the inventive packaging member as the packaging member for packaging the object to be transported between the clean rooms, the FOUP or the FOSB can be transported between the clean rooms while the cleanness of the object to be transported, being the FOUP or the FOSB, is maintained at a high level.

Moreover, the inventive packaging member made of the dust-free cloth is cleanable, and when the packaging member is contaminated with dust, the packaging member can be cleaned and used repeatedly. As a result, reducing the cost of the wrapping material used as a resin bag for wrapping, which has so far been discarded after use, and reducing the cost of work are enabled. In some cases, reducing facilities of a cushion room or an air shower is also enabled.

That is, the inventive packaging member enables transportation of the object to be transported, being the FOUP or the FOSB, between the clean rooms at low cost while the cleanness of the object to be transported is maintained at a high level.

Furthermore, the present invention provides a method for packaging an object to be transported between the clean rooms, the object to be transported being a FOUP or a FOSB, when transport thereof between the clean rooms each having a clean atmosphere of a semiconductor factory, wherein the object to be transported is packaged with a packaging member including the dust-free cloth having dust-proof property and damp-proof property.

In the inventive method for packaging, by packaging the object to be transported, being the FOUP or the FOSB, with the packaging member made of a dust-free cloth having dust-proof property and damp-proof property, the object to be transported, being the FOUP or the FOSB, can be protected from dust generation, the dust of metal contaminant or moisture. By transporting the object to be transported being thus packaged, the object to be transported, being the FOUP or the FOSB, can be transported between the clean rooms while the cleanness of the object to be transported, being the FOUP or the FOSB, is maintained at a high level. Moreover, the inventive packaging member made of the dust-free cloth is cleanable, and when the packaging member is contaminated with the dust, the packaging member can be cleaned and used repeatedly.

That is, when the object to be transported is packaged and transported according to the inventive packaging method, the object to be transported, being the FOUP or the FOSB, can be transported between the clean rooms at low cost while the cleanness of the object to be transported is maintained at a high level.

The present invention also provides a method for transporting an object to be transported between the clean rooms each having a clean atmosphere of a semiconductor factory, wherein the object to be transported is packaged by the method for packaging according to the present invention, and the packaged object to be transported is transported between the clean rooms.

In the inventive method for transporting, by packaging the object to be transported, being the FOUP or the FOSB, according to the inventive packaging method and transporting this packaged object between the clean rooms, thus, the FOUP or the FOSB can be transported between the clean rooms at low cost while the cleanness of the object to be transported, being the FOUP or the FOSB, is maintained at a high level.

Advantageous Effects of Invention

As described above, according to the present invention, it is possible to provide the packaging member (cover), the method for packaging using such packaging member, and the method for transporting, capable of packaging the object to be transported, being the FOUP or the FOSB, and transporting the object between the clean rooms at low cost while to protecting from such as dust including particles and metal impurities, and moisture contained in the outside air to maintain high cleanness of the object to be transported, without using a disposable costly resin wrapping material and a wrapping apparatus, a worker who tear the wrapping and the wrapping bag, and a facility such as a work area or an expensive clean tunnel and clean elevators which have been used.

BRIEF DESCRIPTION OF DRAWINGS

FIG. 1 is a schematic view illustrating an example of a packaging member according to the present invention and a usage example thereof.

FIG. 2 is a flowchart of preparation for shipping a wafer including an example of a method for transporting according to the present invention.

FIG. 3 is a schematic view describing a part of an example of a method for transporting according to the present invention.

FIG. 4 is a schematic view illustrating an example of a transport cart without a packaging member.

FIG. 5 is a graph showing the difference in the number of particles before and after transportation in Example and Comparative Example.

FIG. 6 is a flowchart of a conventional preparation for shipping a wafer.

DESCRIPTION OF EMBODIMENTS

As described above, in the case of transporting an object to be transported, being a FOUP or a FOSB, between clean rooms, packaging the object to be transported individually, or installing a clean space such as a clean tunnel or a clean elevator is needed. However, a large amount of cost and labor of a worker, thus, it is desired to transport the object to be transported at low cost and with a simple procedure while maintaining a high cleanness of the object to be transported.

Thereupon, the present inventor has earnestly studied the problem described above and, as a result, found out that by using a material including a dust-free cloth having dust-proof property and damp-proof property as a packaging member for packaging the object to be transported, being the FOUP or the FOSB, the object to be transported can be transported between the clean rooms at low cost and with a simple procedure while maintaining the high cleanness of the object to be transported, thereby completing the present invention.

That is, the present invention is a packaging member for packaging an object to be transported between the clean rooms, the packaging member being used for packaging the object to be transported, being the FOUP or the FOSB, when transport thereof between the clean rooms each having a clean atmosphere of a semiconductor factory, wherein the packaging member includes a dust-free cloth having dust-proof property and damp-proof property.

In addition, the present invention is a method for packaging an object to be transported between clean rooms, the object to be transported, being a FOUP or a FOSB when transport thereof between clean rooms each having a clean atmosphere of a semiconductor factory, wherein the object to be transported is packaged with a packaging member including a dust-free cloth having dust-proof property and damp-proof property.

Moreover, the present invention is a method for transporting an object to be transported between clean rooms each having a clean atmosphere of a semiconductor factory, wherein the object to be transported is packaged by the method for packaging according to the present invention, and the packaged object to be transported is transported between the clean rooms.

Hereinafter, the present invention will be described with reference to the drawings in detail. However, the present invention is not limited thereto.

[Packaging Member]

To begin with, referring to FIG. 1, one example of the inventive packaging member is described.

In FIG. 1, a FOSB 3, packaged with an inventive packaging member 1, is placed on a transport cart 4 with the packaging member (cover).

The inventive packaging member 1 includes the dust-free cloth with dust-proof and damp-proof properties. The packaging member 1, shown in FIG. 1, includes the dust-free cloth as a main part and a locking member 2.

When a person works in a clean room, the worker wears dust-free working clothes made of the dust-free cloth that minimize dust generation. Further, the sweat produced by the worker contains sodium chloride and magnesium chloride, and the dust-free cloth used for the dust-free work clothes is the dust-proof cloth having been subjected to damp-proof process so as to prevent both moisture permeation and moisture absorption, thus, the sweat is not released to the outside of the dust-free work clothes as water vapor. For example, in the dust-free work clothes, the damp-proof material for preventing moisture absorption and moisture permeation is coated or laminated on the inner side of the dust-proof work clothes. By these functions, even if the person works in the clean room, the dust generation of particles and metal impurities can be suppressed to a minimum degree.

When an object to be transported 3, being the FOUP or the FOSB, is transported between the clean rooms that are in clean atmospheres of a semiconductor factory, by using an inventive packaging member 1 (cover) made of the dust-free cloth used in the dust-free work clothes as the packaging member (cover) for protecting the object to be transported 3 from dust generation, metallic contaminant dust or moisture, the object to be transported 3, being the FOUP or the FOSB, can be transported between the clean rooms while maintaining high cleanness of the object to be transported 3.

As the dust-free cloth, for example, the cloth obtained by processing polyester fibers, polyamide fibers, polyolefin fibers, or polyacrylic fibers can be used. Furthermore, by mixing a fiber containing a material having an antistatic effect with these fibers, the whole packaging member 1 (cover) can be prevented from being electrostatically charged, the adhesion of dust due to electrostatic charge can be prevented.

The locking member 2 for opening and closing the packaging member 1 (cover) is not particularly limited, but a fastener can prevent adhesive strength from decreasing and is excellent in sealing performance and dust-proof property, and thus can be used more suitably than an adhesive tape and a MAGICTAPE (registered trademark). A resin-made fastener is the most suitable from the viewpoint of metal contamination in a semiconductor manufacturing process.

[Method for Packaging and Method for Transporting]

Then, an example of an inventive method for packaging and an example of an inventive method for transporting are described, respectively, with reference to FIG. 2.

As shown in FIG. 2, a shipping container FOSB is processed in accordance with the order of the FOSB receiving step, FOSB cleaning step, FOSB assembling step, FOSB inspecting step, and FOSB shipping process. After the steps from receiving to shipping of the FOSB is performed in a clean room A, wafers that have passed the wafer inspecting step are transported to the shipping organizing step, where the wafers are stored in the FOSB. If the shipping organizing step is performed in the clean room A, there is no problem because the FOSB is transported from the FOSB shipping step to the shipping organizing step within the clean room A. However, if the shipping organizing step is performed in a clean room B, which is different from the clean room A, it is necessary to transport the FOSB once in the outside air environment, i.e., outside the clean rooms.

Conventionally, before shipping from the clean room A, the FOSB is wrapped one by one in a resin bag (FOSB wrapping step), mounted on a transport cart, and transported to the clean room B. Then, the resin bag is torn when the FOSB is put into the clean room B, and the FOSB is taken out and put into the clean room B (FOSB-wrapping removing step). This flowchart is shown in FIG. 6. In the flowchart in FIG. 6, one resin bag is always needed for each FOSB regardless of the transportation distance, and the bag is to be discarded after use in the clean room B. This requires a large amount of cost and labor for a worker. If the clean rooms A and B are close to each other, or located on upper and lower floors, in that case, the rooms can be connected by a clean tunnel or a clean elevator, but a clean space with high cleanness and a FOSB automatic transport facility that does not generate dust are required, and have cost a huge amount of money.

On the other hand, in an example of the inventive method for packaging, shown in FIG. 2, the FOSB that passed the FOSB inspecting step is packaged in the FOSB shipping step by using the packaging member including the dust-free cloth having dust-proof property and damp-proof property. Then, in an example of the inventive method for transporting, shown in FIG. 2, the FOSB thus packaged is transported between clean rooms A and B.

The means for transporting using the packaging member (cover) is not particularly limited, but the FOSB 3 can be transported between the clean rooms by using a transport cart 4 attached with the packaging member (cover), as shown in FIG. 1, for example. The transport cart 4 attached with packaging member (cover) is, for example, a transport cart including, for example, a shelf-like platform having a top board, a bottom board, and one or more boards provided between the top and the bottom boards, placed with four pillars, being provided with casters or other means for moving. In the example shown in FIG. 1, the top, bottom, and four side surfaces of the transport cart 4 are packaged in a state of being covered with the packaging member 1 (cover). The packaging member 1 is provided with a fastener 2 capable of zipping a peripheral edge of the side surface in the longitudinal direction. This fastener 2 is opened, then the FOSB 3 is mounted on the shelf of the transport cart 4, and transported between the clean rooms A and B while the fastener 2 is closed.

According to the inventive method for packaging and the inventive method for transporting as described above, the FOSB 3 is packaged with the packaging member 1, including the dust-free cloth having dust-proof property and damp-proof property, and the thus-packaged FOSB 3 is transported between the clean rooms. Consequently, the FOSB 3 can be transported between the clean rooms A and B while maintaining high cleanness even without using a work area or a costly facility such as a costly clean tunnel or clean elevator.

In addition, the inventive packaging member 1 made of the dust-free cloth is cleanable and can be repeatedly used by cleaning when contaminated with dust. In other words, there is no need to throw away the packaging member 1 after a single use, and the FOSB 3 can be transported at low costs by saving the cost and labor of the worker required for conventional disposal.

Furthermore, one FOSB 3 is mounted on the transport cart 4 in FIG. 1, however, a plurality of FOSB 3 can also be mounted. In the present invention, the FOSB 3 can be transported while maintaining the high cleanness of each FOSB 3 even without individually wrapping as in a conventional way, thus, further cost reduction is possible.

The FOSB 3 transported to the clean room B is transported to the shipping organizing step described above in this clean room and then transported to the wrapping step for shipping and the shipping step sequentially.

The wrapping step for shipping is the step in which attaching a FOSB accessory part, labeling, and wrapping are performed on the FOSB 3 organized in the previous shipping organizing step based on the customer wrapping specifications, and finally, such as the number and position of the label, and the state of wrapping, for example, single layer or dual layers, material, and the like are confirmed and inspected.

The shipping step is a step of packaging the FOSB 3 which has been wrapped and inspected in the wrapping step for shipping on the basis of a package form (such as corrugated cardboard, a container, and the number of packaged FOSB) and on the basis of a customer shipping specification, and the packaged FOSB 3 is transferred to a truck, and then the FOSB 3 is shipped with wafers therein.

Examples

Hereinafter, the present invention will be specifically described with reference to Example and Comparative Example. However, the present invention is not limited thereto.

Example

Steps proceeded based on a flowchart in FIG. 2. FIG. 3 shows a part of an example of a method for transporting in which a packaging member (cover) according to the present invention is used.

FIG. 3 shows a clean room A 10, a cushion room 20, and a general working room 30. The clean room A 10 and the cushion room 20 are connected with each other via a first air shower room 40 sandwiched therebetween. Moreover, the cushion room 20 and the general working room 30 are connected with each other via a second air shower room 50 sandwiched therebetween.

The FOSB, which was cleaned in a FOBS cleaning step, assembled in a FOBS assembling step, and inspected in a FOBS inspecting step according to the flowchart in FIG. 2, was provided in the clean room A 10.

The FOSB was mounted on a transport cart (like a transport cart 5 without packaging member shown in FIG. 4) in the clean room A 10. Doors 11 and 12 on the clean room side of the first air shower room 40 were opened, and then the clean room transport cart 5 was moved from the clean room A 10 to the first air shower room 40. The first air shower room 40 has the doors 11 and 12 on the clean room A 10 side and doors 21 and 22 on the cushion room 20 side, but these doors are configured not to open at the same time. Moreover, an air shower in the first air shower room 40 is designed not to operate when the doors 11 and 12 on the clean room A 10 open, but to operate when the doors 21 and 22 on the cushion room side open.

Then, a transport cart 4 with the packaging member (cover) as shown in FIG. 1, which was fitted with the packaging member 1 made of a polyester dust-free cloth, was provided in the general working room 30, which is connected with the clean room A 10. The packaging member 1 included a fastener 2 capable of zipping a peripheral edge of a side surface in the longitudinal direction. The provided transport cart 4 with the packaging member (cover) had nothing mounted inside. The transport cart 4 with the packaging member (cover) was moved through doors 31 and 32 on the general working room 30 side of the second air shower room 50 to the second air shower room 50 while the doors 31 and 32 on the general working room 30 side of the second air shower room 50 were being opened. When the doors 31 and 32 on the general working room 30 side were closed, an air shower of the second air shower room 50 operated. On finishing of the operation of the air shower, the doors 23 and 24 was opened on the cushion room side of the second air shower room 50. Then, the transport cart 4 with the packaging member (cover) was moved from the second air shower room 50 to the cushion room 20. Moreover, on finishing of the movement, the doors 23 and 24 on the cushion room side of the second air shower room 50 were closed. Furthermore, the doors 21 and 22 on the cushion room 20 side of the first air shower room 40 were opened from the cushion room 20 side. The transport cart 4 with the packaging member (cover), which moved into the cushion room 20, was brought alongside and in close contact with an opened part of the doors 21 and 22 on the cushion room side of the first air shower room 40, as shown in FIG. 3. In this state, a surface, which was released by the doors 21 and 22 on the cushion room 20 side of the first air shower room 40, was in close contact with the surface with fastener 2 on packaging member 1 of the transport cart 4 with the packaging member (cover). In this state, the fastener 2 of the transport cart 4 with the packaging member (cover) was opened, and the FOSB, which was provided in the FOSB shipping step and mounted on the clean room transport cart 5, was transported to the transport cart 4 with the packaging member (cover).

After a transfer was finished, the fastener 2 of the transport cart 4 with the packaging member (cover) was closed, the transport cart 4 with the packaging member (cover) was moved away from the vicinity of the doors 21 and 22 on the cushion room side of the first air shower room 40 to around the center of the cushion room 20.

Then, the released doors 21 and 22 on the cushion room 20 side of the first air shower room 40 were closed. In the first air shower room 40, only the clean room transport cart 5 which had finished the transfer was present. On closing of the doors 21 and 22, the air shower was operated, and the air in the first air shower room 40 was replaced with the air of the same cleanness as in the clean room A 10.

After the air shower operation was finished, the doors 11 and 12 on the clean room side of the first air shower room 40 were opened, then the clean room transport cart 5 was moved from the first air shower room 40 into the clean room A 10, and then the doors 11 and 12 on the clean room side of the first air shower room 40 were closed.

Consequently, a transfer operation of the FOSB into the transport cart 4 with the packaging member (cover) was finished. In the cushion room 20, the transport cart 4 with the packaging member (cover) in which the FOSB 3 was mounted and housed was present, as shown in FIG. 1.

Next, the transport cart 4 with the packaging member (cover), in which the FOSB 3 was mounted and housed, was moved to the second air shower room 50 and the general working room 30 in the reverse order.

Transportation was performed from the general working room 30, via a corridor, to a general working room connected with a clean room B, where the shipping organizing step was to be performed, and with a cushion room. In Example, the clean room B, the general working room and the cushion room, which are connected with the clean room B, have an identical arrangement as shown in FIG. 3. In the following, a description will be given with reference to FIG. 3 again.

A clean room transport cart being empty (similar to the transport cart 5 without packaging member in FIG. 4) was provided in a clean room B 10, then doors 11 and 12 on the clean room side of a first air shower room 40 were opened, the clean room transport cart 5 was moved from the clean room B 10 to the first air shower room 40. The clean room transport cart 5 being empty was kept on standby at the first air shower room 40, and the doors 11 and 12 on the clean room side of the first air shower room 40 were closed.

Next, in order to transport the FOSB from the clean room A, in state of doors 31 and 32 on the general working room 30 side of a second air shower room 50 on the clean room B side being opened, the transport cart 4 with the packaging member (cover), in which the FOSB 3 from the clean room A was mounted and housed, was moved through the doors 31 and 32 to the general working room side to the second air shower room 50. On closing of the door 31 and the door 32 on the general working room side were, an air shower in the second air shower room 50 was operated. On finishing of the air shower operation, doors 23 and 24 on the cushion room side of the second air shower room 50 were opened. Then, the transport cart 4 with the packaging member (cover) was moved from the second air shower room 50 to the cushion room 20. On finishing of the movement, the doors 23 and 24 on the cushion room side of the second air shower room 50 were closed.

Then, the doors 21 and 22 on the cushion room 20 side of the first air shower room 40 were opened from the cushion room 20 side. The transport cart 4 with the packaging member (cover), which have been moved to the cushion room 20, was brought alongside and in close contact with an opened part of the doors 21 and 22 on the cushion room side of the first air shower room 40 as shown FIG. 3. In this state, a surface, which was released by the doors 21 and 22 on the cushion room 20 side of the first air shower room 40, was in close contact with the surface with fastener 2 on packaging member 1 of the transport cart 4 with the packaging member (cover). In this state, the fastener 2 of the transport cart 4 with the packaging member (cover) was opened, and the FOSB 3 was transferred to the clean room transport cart 5, provided in the clean room B 10. On finishing of the transfer of the FOSB 3, the fastener 2 on the transport cart 4 with the packaging member (cover) was closed, and the cart was moved away from the doors 21 and 22 on the cushion room side of the first air shower room 40 to around the center of the cushion room 20.

Then, the released doors 21 and 22 on the cushion room 20 side of the first air shower room 40 were closed. In the first air shower room 40, only the clean room transport cart 5, which completed the transfer, was present. On closing of the doors 21 and 22, the air shower was operated, and the air in the first air shower room 40 was replaced with an air of the same cleanness as that of the clean room B 10.

After the air shower operation was finished, the doors 11 and 12 on the clean room side of the first air shower room 40 were opened, the clean room transport cart 5 was moved from the first air shower room 40 into the clean room B 10, and then the doors 11 and 12 on the clean room side of the first air shower room 40 were closed.

Consequently, the transfer operation of the FOSB 3 to the clean room transport cart 5 had finished. In the cushion room 20, there was the transport cart 4 with the packaging member (cover) being empty after transferring the FOSB. This transport cart 4 with the packaging member (cover) was moved to the clean room A to transport a FOSB again.

Comparative Example

The processes were progressed according to the flowchart shown in FIG. 6. In a FOSB wrapping step shown in FIG. 6, the FOSB 3 was double-wrapped in a bag 6 made of polyethylene, as shown in FIG. 4, and an outer wrapping was removed by tearing in a cushion room 20 in FIG. 3 as a FOSB wrapping removing step. Then, an inner wrapping was removed by tearing in a clean room B 10. The same flowchart as in Example was used for transportation between clean rooms A and B, except that a transportation cart 5 without the packaging member (cover) shown in FIG. 4 was used (Result)

Based on the transport methods of Example and Comparative Example described above, 25 polished wafers having 300 mmϕ were provided for transport evaluation, and then an average number of particles having 46 nm size or larger per wafer was calculated using a particle counter SP2 manufactured by KLA Corporation, and then the difference in the number of particles before and after transport was normalized and compared between Example and Comparative Example. FIG. 5 shows the numbers of increased particles in the Example and Comparative Example when the number of increased particles in the Comparative Example is defined as 1. As shown in FIG. 5, the results of the Example compared with Comparative Example were equivalent, and the level thereof was not problematic. Moreover, the surfaces of the wafers were inspected for spots, cloudiness, and haze, as shown in Table 1 below, and no abnormalities such as spots, cloudiness, or haze were observed on the wafer surface due to changes in the temperature and humidity of the outer environment in both Example and Comparative Example.

TABLE 1

| | Example | Comparative Example |
|---|---|---|
| Spots | None | None |
| Cloudiness | None | None |
| Haze | None | None |

The above results indicate that, in Example in which packaging and transporting were performed by using the inventive packaging member, the FOSB was able to be transported with the same high cleanness as in the Comparative Example that was a conventional method for packaging and transporting even if no additional high cleanness space was provided to connect the clean rooms A and B. In the Comparative Example, the FOSB was transported using a double polyethylene bag, and after the transport, the bag needed to be removed by tearing and discarded, thus more costly than Example.

Moreover, the packaging and transporting were performed in the same way as in the above Example, except that the object to be transported was the FOUP instead of the FOSB. As a result, even if the object to be transported was the FOUP, the FOUP was able to be transported with high cleanness by using the inventive packaging member for packaging and transporting.

These facts indicate that the packaging and transporting of the FOUP or the FOSB using the inventive packaging member enable the FOUP or the FOSB to be transported between the clean rooms at ease and low cost while the high cleanness of the FOUP or the FOSB is maintained.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

The invention claimed is:

1. A packaging member for packaging an object to be transported between clean rooms each having a clean atmosphere of a semiconductor factory, the object to be transported being a FOUP or a FOSB, wherein the packaging member includes a dust-free cloth having dust-proof property and damp-proof property and the packaging member is configured to, while the object to be transported is placed on a moveable transport cart that includes casters, package the object to be transported together with the transport cart such that top, bottom, and four side surfaces of the transport cart are covered with the packaging member.

2. A method for packaging an object to be transported between clean rooms each having a clean atmosphere of a semiconductor factory, the object to be transported being a FOUP or a FOSB, the method composing:

placing the object to be transported on a moveable transport cart that includes casters, and packaging the object to be transported with a packaging member including a dust-free cloth having dust-proof property and damp-proof property while the object to be transported is placed on the transport cart, thereby covering top, bottom, and four side surfaces of the transport cart with the packaging member.

3. A method for transporting an object to be transported between clean rooms each having a clean atmosphere of a semiconductor factory, the method comprising:

packaging the object to be transported by the method for packaging according to claim 2, and transporting the packaged object to be transported between the clean rooms using the transport cart.

* * * * *